United States Patent
Yagita et al.

(10) Patent No.: US 10,471,651 B2
(45) Date of Patent: Nov. 12, 2019

(54) REPAIR SYSTEM, REPAIR-DATA PROVIDING APPARATUS AND REPAIR-DATA GENERATION METHOD

(71) Applicant: MITSUBISHI HITACHI POWER SYSTEMS, LTD., Kanagawa (JP)

(72) Inventors: Hiroyuki Yagita, Kanagawa (JP); Yui Okada, Kanagawa (JP); Hiroaki Ishikawa, Kanagawa (JP); Jun Hyodo, Kanagawa (JP); Hiroyuki Esashi, Kanagawa (JP)

(73) Assignee: MITSUBISHI HITACHI POWER SYSTEMS, LTD., Kanagawa (JP)

( * ) Notice: Subject to any disclaimer, the term of this patent is extended or adjusted under 35 U.S.C. 154(b) by 354 days.

(21) Appl. No.: 15/309,950

(22) PCT Filed: Jun. 3, 2015

(86) PCT No.: PCT/JP2015/066080
§ 371 (c)(1),
(2) Date: Nov. 9, 2016

(87) PCT Pub. No.: WO2015/186751
PCT Pub. Date: Dec. 10, 2015

(65) Prior Publication Data
US 2017/0176978 A1    Jun. 22, 2017

(30) Foreign Application Priority Data

Jun. 4, 2014  (JP) .................................. 2014-115808
Jun. 4, 2014  (JP) .................................. 2014-115809

(51) Int. Cl.
*B23K 26/342* (2014.01)
*B33Y 30/00* (2015.01)
(Continued)

(52) U.S. Cl.
CPC ............ *B29C 64/00* (2017.08); *B23K 26/342* (2015.10); *B33Y 30/00* (2014.12); *B33Y 40/00* (2014.12);
(Continued)

(58) Field of Classification Search
CPC ....... B23K 26/342; B29C 64/00; B33Y 30/00; B33Y 40/00; B33Y 50/00; B33Y 50/02;
(Continued)

(56) References Cited

U.S. PATENT DOCUMENTS 9,873,229 B2      1/2018   Chun et al.
10,155,366 B2 *  12/2018   Whitworth ............ B29C 37/006
(Continued)

FOREIGN PATENT DOCUMENTS

JP    9-286058     11/1997
JP    11-333574    12/1999
(Continued)

OTHER PUBLICATIONS

International Preliminary Report on Patentability and Written Opinion of the International Searching Authority dated Dec. 15, 2016 in International (PCT) Application No. PCT/JP2015/066080 with English translation.
(Continued)

*Primary Examiner* — Abdelmoniem I Elamin
(74) *Attorney, Agent, or Firm* — Wenderoth, Lind & Ponack, L.L.P.

(57) ABSTRACT

A repair system includes a 3D-object repair apparatus and a repair-data providing apparatus. The repair-data providing apparatus includes: a damaged-part determining part to determine a location of the damaged part of the object to be repaired by comparing 3D-object data of the object to be repaired obtained by the scanner and 3D-object data of an original of the object to be repaired; a mode selecting part to
(Continued)

select a repair mode from among a first repair mode of repairing only the damaged part of the object to be repaired and a second repair mode of repairing a range broader than the damaged part of the object to be repaired, the range including the damaged part, in accordance with a condition of a damaged surface of the object to be repaired; and a repair-data generating part to generate the 3D-object repair data corresponding to the selected repair mode.

15 Claims, 8 Drawing Sheets

(51) Int. Cl.
  *B33Y 40/00* (2015.01)
  *B33Y 50/02* (2015.01)
  *B29C 64/00* (2017.01)
  *B33Y 50/00* (2015.01)
  *G05B 19/4099* (2006.01)
(52) U.S. Cl.
  CPC ............... *B33Y 50/00* (2014.12); *B33Y 50/02* (2014.12); *G05B 19/4099* (2013.01); *G05B 2219/35134* (2013.01); *G05B 2219/49007* (2013.01); *G05B 2219/49023* (2013.01)
(58) Field of Classification Search
  CPC ...... G05B 19/4099; G05B 2219/35134; G05B 2219/49007; G05B 2219/49023
  See application file for complete search history.

(56) References Cited

U.S. PATENT DOCUMENTS

| | | | |
|---|---|---|---|
| 2006/0274370 | A1 | 12/2006 | Shima |
| 2009/0113545 | A1 | 4/2009 | Pic et al. |
| 2011/0099810 | A1* | 5/2011 | Stankowski ............ B22F 7/062 29/888 |
| 2013/0056131 | A1* | 3/2013 | Whitworth ............ B29C 37/006 156/64 |
| 2013/0258376 | A1 | 10/2013 | Tsuchiya |
| 2014/0058959 | A1 | 2/2014 | Isbjornssund et al. |
| 2014/0136832 | A1 | 5/2014 | Klum et al. |
| 2015/0057784 | A1 | 2/2015 | Butler et al. |
| 2015/0197063 | A1* | 7/2015 | Shinar ..................... G06F 17/50 700/98 |
| 2016/0300003 | A1* | 10/2016 | Knoll .................. G06F 17/5086 |
| 2017/0232518 | A1* | 8/2017 | Shi .......................... B22F 3/105 419/7 |

FOREIGN PATENT DOCUMENTS

| | | |
|---|---|---|
| JP | 2001-9920 | 1/2001 |
| JP | 2003-186642 | 7/2003 |
| JP | 2003-311463 | 11/2003 |
| JP | 2005-035299 | 2/2005 |
| JP | 2006-137173 | 6/2006 |
| JP | 2006-231409 | 9/2006 |
| JP | 2007-106070 | 4/2007 |
| JP | 2007-145021 | 6/2007 |
| JP | 2008-507412 | 3/2008 |
| JP | 2008-194968 | 8/2008 |
| JP | 2008-302701 | 12/2008 |
| JP | 2009-154176 | 7/2009 |
| JP | 2010-120104 | 6/2010 |
| JP | 2010-207884 | 9/2010 |
| JP | 2010-276491 | 12/2010 |
| JP | 4617573 | 1/2011 |
| JP | 2011-528075 | 11/2011 |
| JP | 2012-86235 | 5/2012 |
| JP | 2012-213970 | 11/2012 |
| WO | 2010/026951 | 3/2010 |

OTHER PUBLICATIONS

International Preliminary Report on Patentability and Written Opinion of the International Searching Authority dated Dec. 15, 2016 in International (PCT) Application No. PCT/JP2015/066076 with English translation.
International Search Report dated Aug. 4, 2015 in International (PCT) Application No. PCT/JP2015/066076.
International Search Report dated Sep. 1, 2015 in International (PCT) Application No. PCT/JP2015/066080.
Japanese Notice of Allowance dated Jun. 24, 2016 in Japanese Patent Application No. 2014-115808 with English translation.
Japanese Notice of Allowance dated Apr. 22, 2016 in Japanese Patent Application No. 2014-115809 with English translation.
Notice of Allowance dated May 15, 2018 in U.S. Appl. No. 15/309,961.

* cited by examiner

REPAIR SYSTEM, REPAIR-DATA PROVIDING APPARATUS AND REPAIR-DATA GENERATION METHOD

TECHNICAL FIELD

The present disclosure relates to a repair system using a three-dimensional (3D) object repairing apparatus, a repair-data providing apparatus, and a repair-data generation method.

BACKGROUND ART

In recent years, an additive manufacturing apparatus for producing a 3D object by laminating a modeling material is attracting attention. Patent Document 1 discloses a method of supporting product manufacture aimed at enabling receipt of products that does not depend on the geographical position of a supplier, let alone order of products by a client.

According to the method of supporting product manufacture disclosed in Patent Document 1, a communication system is provided with a client computer of the client, a manufacturing computer for controlling a manufacturing apparatus for manufacturing products on the basis of manufacture data, and a server computer of a provider who uses the manufacturing apparatus to manufacture and sell products, connected to each other. In the communication system, the server computer transmits to the manufacturing computer the manufacture data for manufacturing products according to an order of the client from the client computer. The manufacturing computer is installed at a location convenient for the client (e.g. the client's house), alongside with the manufacturing apparatus and the client computer. The manufacturing computer receives the manufacture data and operates the manufacturing apparatus to manufacture products according to the order of the client.

CITATION LIST

Patent Literature

Patent Document 1: JP4617573B

SUMMARY

Problems to be Solved

Besides producing a new product in whole, an additive manufacturing apparatus can be used to repair a damaged part of an object to be repaired. If a 3D-object repair apparatus is to be used to repair a damaged part of an object to be repaired, the amount of a modeling material can be reduced as compared a case where the object to be repaired is freshly manufactured as a whole. However, strain or cracks may remain to some extent around a damaged part, and thus it may be difficult to properly repair an object to be repaired by repairing only the damage part, depending on the condition of the damaged surface of the object to be repaired.

In this regard, the method of supporting product manufacture according to Patent Document 1 is designed to produce a new product in whole, and the document does not mention the above problem in relation to repair of an object.

An object of at least one embodiment of the present invention is to provide a repair system, a repair-data providing apparatus, and a repair-data generating method, whereby it is possible to properly repair an object to be repaired regardless of the condition of a damaged surface of the object.

Solution to the Problems (1) A repair system according to some embodiments of the present invention comprises: a 3D-object repair apparatus configured to repair a damaged part of an object to be repaired by laminating a modeling material; and a repair-data providing apparatus configured to provide the 3D-object repair apparatus with 3D-object repair data for repairing the damaged part of the object to be repaired. The 3D-object repair apparatus comprises a scanner configured to 3D-scan the object to be repaired to obtain 3D-object data of the object to be repaired. The repair-data providing apparatus comprises: a damaged-part determining part configured to determine a location of the damaged part of the object to be repaired by comparing 3D-object data of the object to be repaired obtained by the scanner and 3D-object data of an original of the object to be repaired; a mode selecting part configured to select a repair mode from among a first repair mode of repairing only the damaged part of the object to be repaired and a second repair mode of repairing a range broader than the damaged part of the object to be repaired, the range including the damaged part, in accordance with a condition of a damaged surface of the object to be repaired; and a repair-data generating part configured to generate the 3D-object repair data corresponding to the repair mode selected by the mode selecting part.

With the above repair system (1), it is possible to repair the damaged part properly regardless of the condition of a damaged surface of the object to be repaired.

(2) In some embodiments, in the above described repair system, the 3D-object repair apparatus further comprises a melting unit configured to melt a periphery of the damaged part of the object to be repaired. The melting unit is configured to melt the periphery of the damaged part of the object to be repaired if the second repair mode is selected by the mode selecting part.

With the above repair system (2), it is possible to repair the damaged part of the object to be repaired properly even if strain or cracks due to damage remain around the damaged part of the object to be repaired.

(3) In some embodiments, in the above described repair system (2), the melting unit is configured to, in the second repair mode, adjust a depth or a range for melting the periphery of the damaged part in accordance with the condition of the damaged surface of the object to be repaired.

With the above repair system (3), it is possible to repair the damaged part of the object to be repaired even more properly even if strain or cracks due to damage remain around the damaged part of the object to be repaired.

(4) In some embodiments, in the repair system according to any one of the above (1) to (3), the 3D-object repair apparatus further includes a grinding unit configured to grind a periphery of the damaged part of the object to be repaired, and the grinding unit is configured to, in the second repair mode, grind the periphery of the damaged part of the object to be repaired before lamination of the modeling material.

With the above repair system (4), it is possible to repair the damaged part of the object to be repaired properly even if strain or cracks due to damage remain around the damaged part.

(5) In some embodiments, in the above repair system (4), the grinding unit is configured to, in the second repair mode, adjust a depth or a range for grinding the periphery of the damaged part in accordance with the condition of the damaged surface of the object to be repaired.

With the above repair system (5), it is possible to repair the damaged part of the object to be repaired more properly even if strain or cracks due to damage remain around the damaged part of the object to be repaired.

(6) In some embodiments, in the above repair system (2) or (3), the 3D-object repair apparatus further includes a grinding unit configured to grind a periphery of the damaged part of the object to be repaired. The scanner is configured to 3D-scan again the object to be repaired after the melting unit melts the periphery of the damaged part. The grinding unit is configured to perform grinding on the basis of a post-melting 3D-object data of the object to be repaired obtained by the scanner.

With the above described repair system (6), the grinding unit performs grinding after the melting unit melts the periphery of the damaged part, and thereby it is possible to perform accurate grinding, and to repair the damaged part even more properly.

(7) In some embodiments, in the repair system according to any one of the above (2) to (6), the 3D-object repair apparatus further comprises a reservoir tank for storing a modeling material removed by the melting unit or the grinding unit, and the modeling material stored in the reservoir tank is used to repair the object to be repaired.

With the above described repair system (7), it is possible to reuse a modeling material removed by melting or grinding, and thus to reduce the total amount of a modeling material used to repair the object to be repaired.

(8) In some embodiments, in the repair system according to any one of the above (2) to (7), the 3D-object repair apparatus or the repair-data providing apparatus further includes a repair-target location specifying part configured such that a repair-target location of the object to be repaired is manually specifiable, and the damaged-part determining part is configured to determine the damaged part within a range of the repair-target location specified by the repair-target location specifying part.

With the above described repair system (8), it is possible to specify a desired repair-target location on the object to be repaired before repairing the damaged part in the specified range.

(9) A repair-data providing apparatus for providing 3D-object repair data for repairing a damaged part of an object to be repaired, according to some embodiments of the present invention, comprises: a damaged-part determining part configured to determine a location of the damaged part of the object to be repaired by comparing 3D-object data obtained by 3D-scanning the object to be repaired and 3D-object data of an original of the object to be repaired; a mode selecting part configured to select a repair mode from among a first repair mode of repairing only the damaged part of the object to be repaired and a second repair mode of repairing a range broader than the damaged part of the object to be repaired, the range including the damaged part, in accordance with a condition of a damaged surface of the object to be repaired; and a repair-data generating part configured to generate the 3D-object repair data corresponding to the repair mode selected by the mode selecting part.

With the above repair-data providing apparatus (9), it is possible to provide 3D-object repair data whereby it is possible to repair the damaged part of the object to be repaired properly regardless of the condition of a damaged surface of the object to be repaired.

(10) A method of generating repair data for generating 3D-object repair data for repairing a damaged part of an object to be repaired, according to some embodiments, comprises: a damaged-part specifying step of specifying the damaged part of the object to be repaired by comparing 3D-object data obtained by 3D-scanning the object to be repaired and 3D-object data of an original of the object to be repaired; a selecting step of selecting a repair mode from among a first repair mode of repairing only the damaged part of the object to be repaired and a second repair mode of repairing a range broader than the damaged part of the object to be repaired, the range including the damaged part, in accordance with a condition of a damaged surface of the object to be repaired; and a generating step of generating the 3D-object repair data corresponding to the repair mode selected in the selecting step.

According to the above method of generating repair data (10), it is possible to provide 3D-object repair data whereby it is possible to repair the damaged part properly regardless of the condition of a damaged surface of the object to be repaired.

Advantageous Effects

According to an object of at least one embodiment of the present invention, it is possible to provide a repair system, a repair-data providing apparatus, and a repair-data generating method, whereby it is possible to repair an object to be repaired properly regardless of the condition of a damage surface of the object.

BRIEF DESCRIPTION OF DRAWINGS

FIG. 3A is a diagram showing an example of selecting the first repair mode, and FIG. 3B is a diagram showing an example of selecting the second repair mode.

FIG. 4A is a perspective view of an object to be repaired. FIG. 4B is a cross-sectional view of the object to be repaired, taken along line A-A.

DETAILED DESCRIPTION

Embodiments of the present invention will now be described in detail with reference to the accompanying drawings. It should be noted that, unless otherwise particularly specified, the sizes, materials, shapes, and relative arrangement or the like of constituent components described in these embodiments are not intended to limit the scope of this invention.

Figure 1:
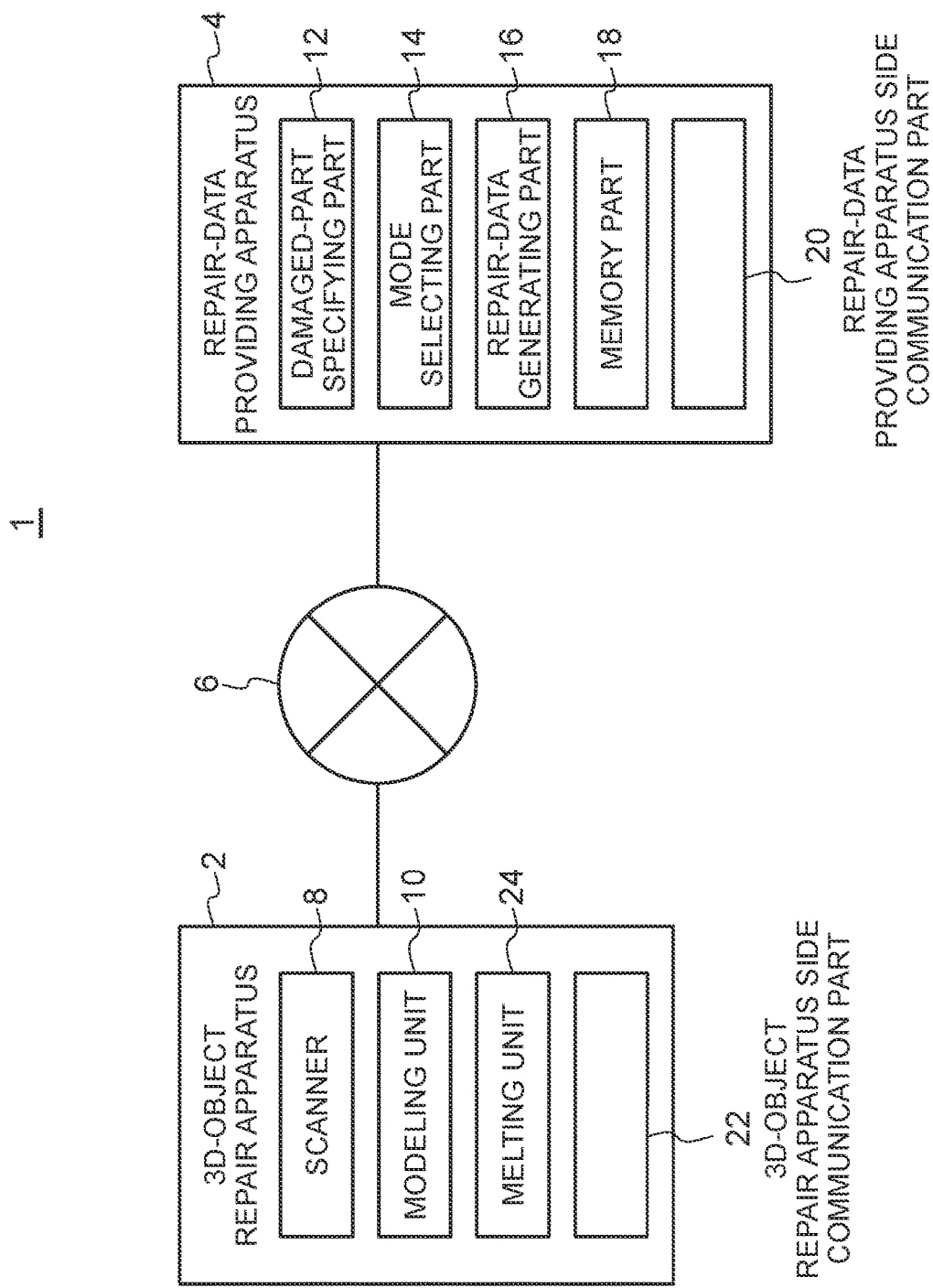
FIG. 1 is a schematic overall diagram of a repair system according to some embodiments.

FIG. 1 is a schematic overall diagram of a repair system 1 according to some embodiments. The repair system 1 includes a 3D-object repair apparatus 2 for repairing a damaged part of an object to be repaired by laminating a modeling material, and a repair-data providing apparatus 4 for providing the 3D-object repair apparatus 2 with 3D-object repair data for repairing a damaged part of an object to be repaired. The 3D-object repair apparatus 2 and the repair-data providing apparatus 4 are configured to be communicable with each other via a network 6.

The 3D-object repair apparatus 2 at least includes a scanner 8 for 3D-scanning an object to be repaired to obtain 3D-object data of the object, and a modeling unit 10 for modeling by the "additive layer manufacturing" process, in which a modeling material is stacked in layers. More specifically, there are several types of the additive layer manufacturing process, including the ink-jet type of injecting molten synthetic resin or the like into layers, the light-polymerization type of curing photo-curable resin with UV or the like into layers, the fused-deposition modeling type of melting and forming a thermoplastic resin such as ABS resin and PLA resin into layers, the selective laser sintering type of sintering layers of powdered material with high-power laser beam or the like, and the sheet lamination type of laminating sheets. In an embodiment, the modeling unit 10 may have a 3D-modeling function for modeling a new object instead of repairing, in addition to a modeling function for repair.

The repair-data providing apparatus 4 includes a damaged-part determining part 12 for determining a damaged part of an object to be repaired, a mode selecting part 14 for selecting a repair mode in accordance with the condition of a damaged surface of the object to be repaired, and a repair-data generating part 16 for generating 3D-object repair data according to the repair mode selected by the mode selecting part 14.

Figure 2A:
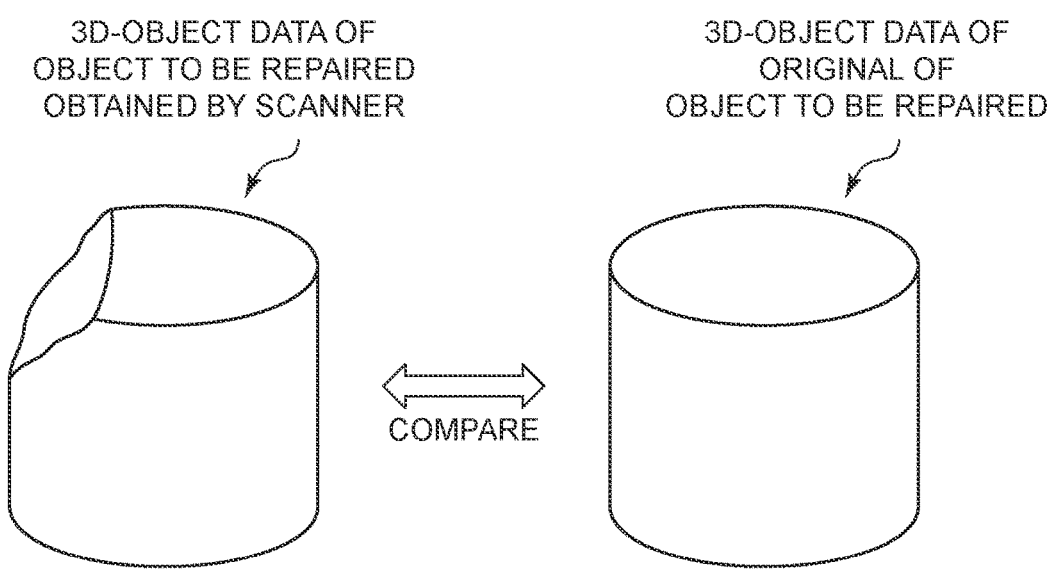
FIG. 2A is a diagram showing comparison between 3D-object data of an object to be repaired obtained by a scanner and 3D-object data of an original of the object to be repaired.
Figure 2B:
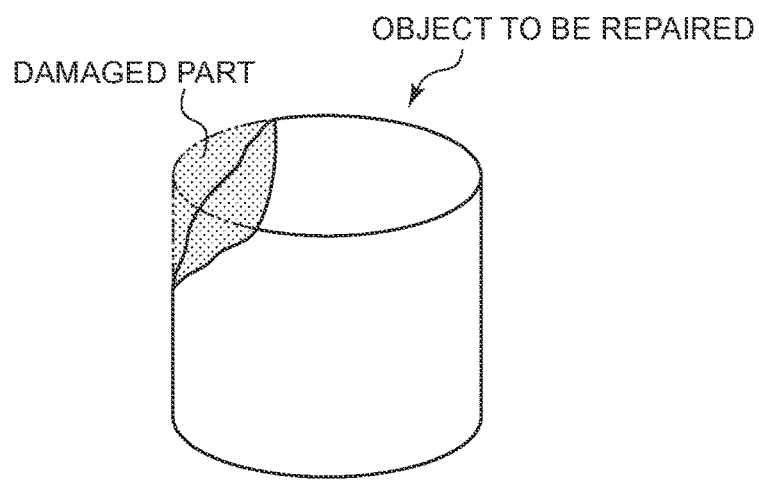
FIG. 2B is a diagram for describing a state in which a damaged part of the object to be repaired is specified.

The damaged-part determining part 12 compares 3D-object data of an object to be repaired obtained by the scanner 8 and 3D-object data of the original of the object to be repaired, as depicted in FIG. 2A, and determines a damaged part of the object to be repaired (calculates 3D-object data representing the damaged part), as depicted in FIG. 2B. The 3D-object data of the original of the object to be repaired may be stored in a memory part 18 of the repair-data providing apparatus 4, or in a non-depicted memory part disposed outside the repair-data providing apparatus 4. In other words, the 3D-object data only needs to be stored where it is readable when the damaged-part determining part 12 determines the damaged part of the object to be repaired.

The mode selecting part 14 selects a repair mode from among the first repair mode of performing repair of only the damaged part of the object to be repaired and the second repair mode of performing repair a range broader than the damaged part including the damaged part of the object to be repaired, in accordance with a condition of the damaged surface corresponding to the damaged part determined by the damaged-part determining part 12. A specific example of a method of selecting a repair mode by the mode selecting part 14 will now be described with reference to FIG. 3.

Figure 3A:
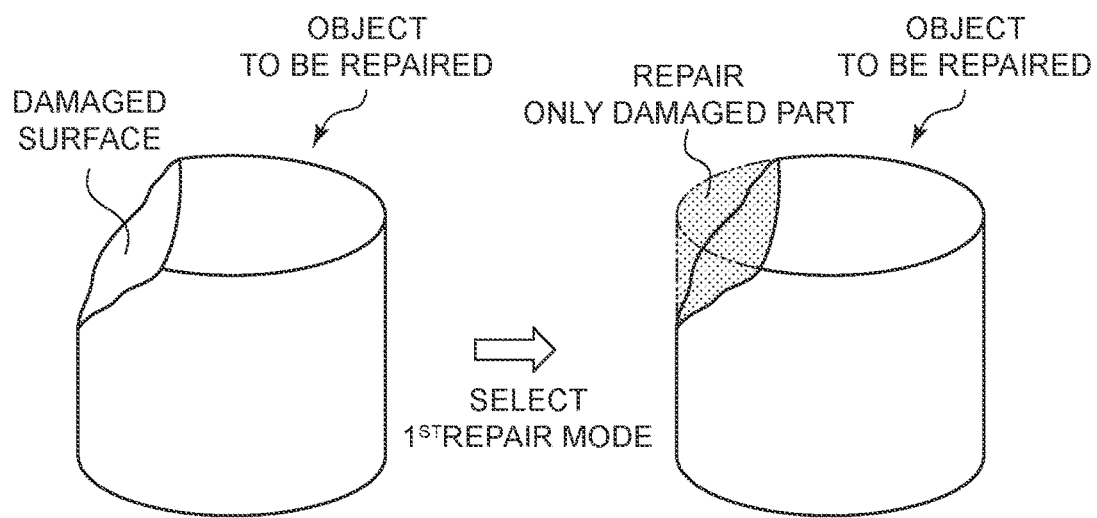
FIGS. 3A and 3B are diagrams for describing a method of selecting a repair mode by a mode selecting part.
Figure 3B:
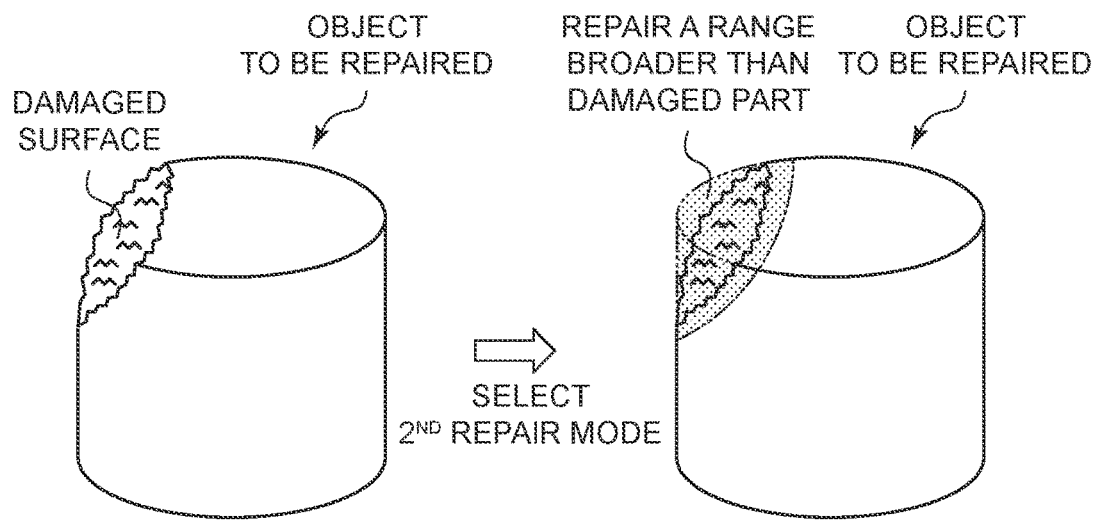

FIG. 3 is a diagram for describing an example of a method of selecting a repair mode by the mode selecting part 14 according to some embodiments. In some embodiments, the mode selecting part 14 may select the first repair mode if the condition of the damaged surface of the object to be repaired is smoother than a predetermined standard, as depicted in FIG. 3A, and may select the second repair mode if not smoother than the predetermined standard, as depicted in FIG. 3B. It should be noted that the "predetermined standard" may be determined by a surface roughness (ten-point height roughness, arithmetic average roughness, etc.), for instance. Specifically, the first repair mode may be selected if the surface roughness of the damaged surface is less than a predetermined value, and the second repair mode may be selected if the surface roughness of the damaged surface is equal to or more than the predetermined value. Furthermore, the "predetermined standard" may be set taking account of the size (at least one of the length, width, or depth) of each crack formed on the damaged surface, for instance.

The repair-data generating part 16 is configured to generate 3D-object repair data corresponding to the repair mode selected by the mode selecting part 14. For instance, if the first repair mode is selected by the mode selecting part 14, 3D-object repair data for repairing only the damaged part of the object to be repaired is generated. On the other hand, if the second repair mode is selected by the mode selecting part 14, 3D-object repair data for repairing a range broader than the damaged part and including the damaged part of the object to be repaired is generated. In other words, the 3D-object repair data corresponding to the first repair mode at least includes 3D-object data representing the damaged part of the object to be repaired, and the 3D-object repair data corresponding to the second repair mode at least includes 3D-object data representing a repair range broader than the damaged part and including the damaged part of the object to be repaired.

The 3D-object repair data generated by the repair-data generating part 16 is transmitted to a 3D-object repair apparatus side communication part 22 of the 3D-object repair apparatus 2 from a repair-data providing apparatus side communication part 20 of the repair-data providing apparatus 4, and the 3D-object repair apparatus 2 repairs the damaged part on the basis of the 3D-object repair data.

As described above, the mode selecting part 14 selects a repair mode from among the first repair mode of repairing only the damaged part of the object to be repaired and the second repair mode of repairing a range broader than the damaged part including the damaged part of the object to be repaired, in accordance with the condition of a damaged surface of the object to be repaired. Accordingly, it is possible to repair the damaged part properly regardless of the condition of a damaged surface of the object to be repaired.

Figure 4A:
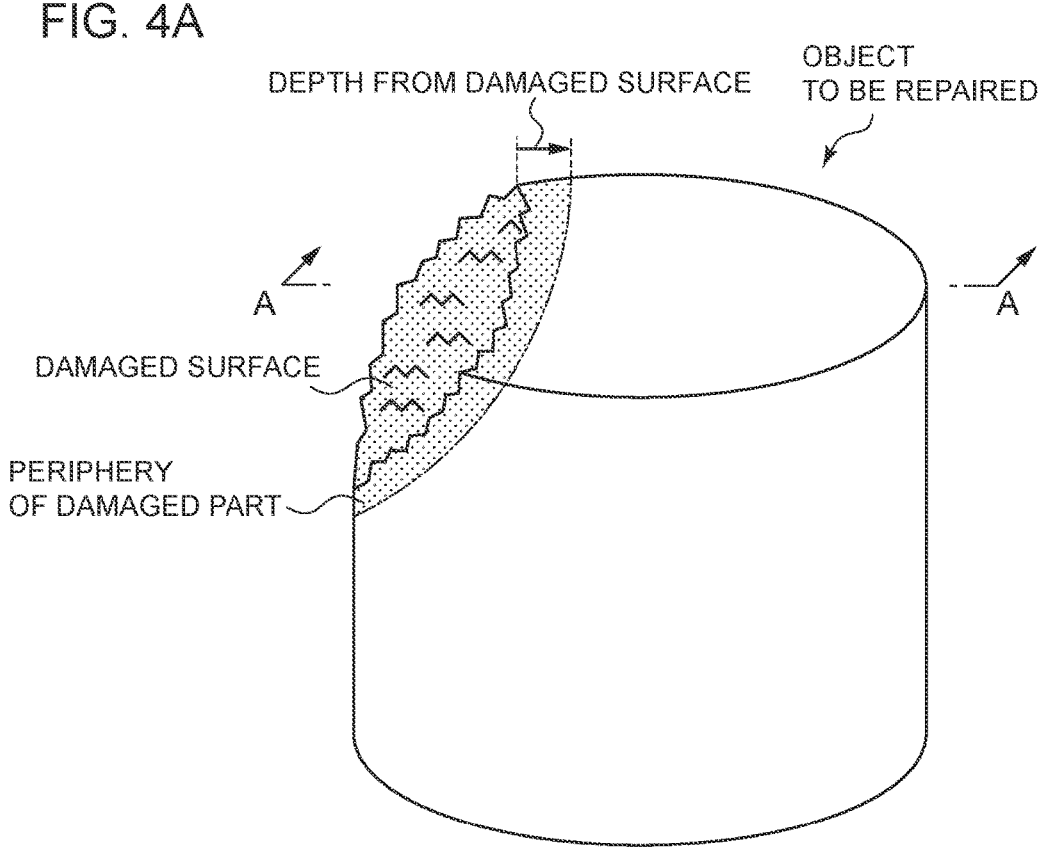
FIGS. 4A and 4B are diagrams showing the periphery of a damaged part of an object to be repaired.
Figure 4B:
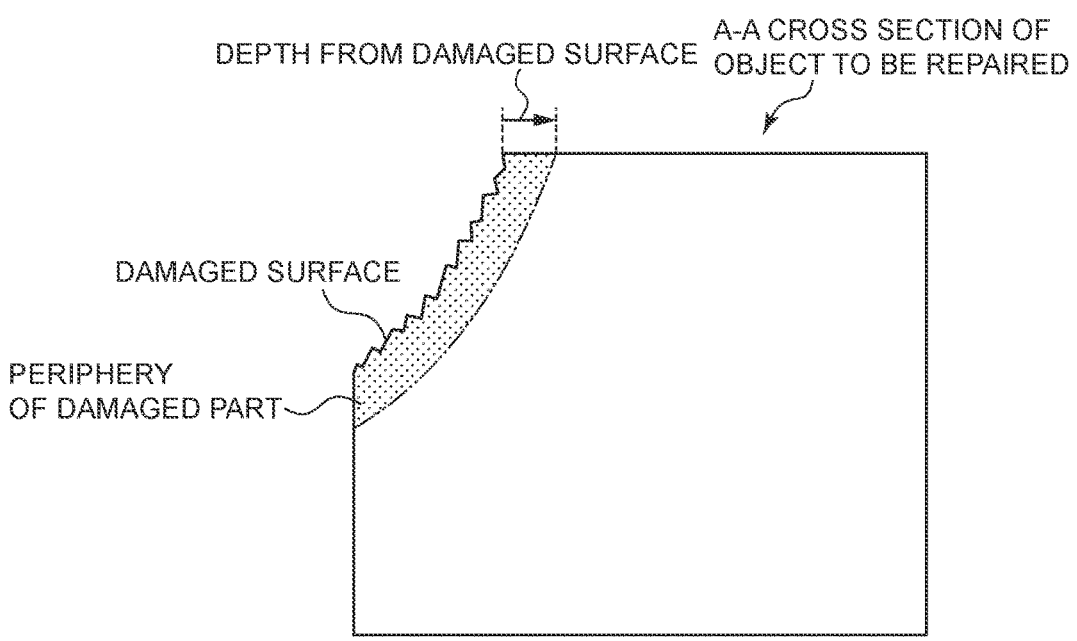

The 3D-object repair apparatus 2 depicted in FIG. 1 further includes a melting unit 24 for melting a periphery (the damaged surface and its periphery; see FIGS. 4A and 4B) of the damaged part of the object to be repaired, to repair a range broader than the damaged part of the object to be repaired. The melting unit 24 is configured to melt the periphery of the damaged part of the object to be repaired if the second repair mode is selected by the mode selecting part 14. Accordingly, it is possible to repair the damaged part properly even if strain or cracks due to damage remain around the damaged part of the object to be repaired. Furthermore, a laser for sintering a powdered material used in the selective laser sintering or an infrared laser for melting a powdered metal may be diverted to the melting unit 24.

Furthermore, in the second repair mode, the melting unit 24 may adjust the depth (depth from the damaged surface; see FIGS. 4A and 4B) or the range for melting the periphery of the damaged part in accordance with the condition of the damaged surface of the object to be repaired. Accordingly, it is possible to repair the damaged part more properly even if strain or cracks due to damage remain around the damaged part of the object to be repaired. If the melting unit 24 is to melt the periphery of the damaged part of the object to be repaired, the repair-data generating part 16 generates 3D-object repair data that includes the 3D-object data indicating the range to be melted on the object to be repaired.

Figure 5:
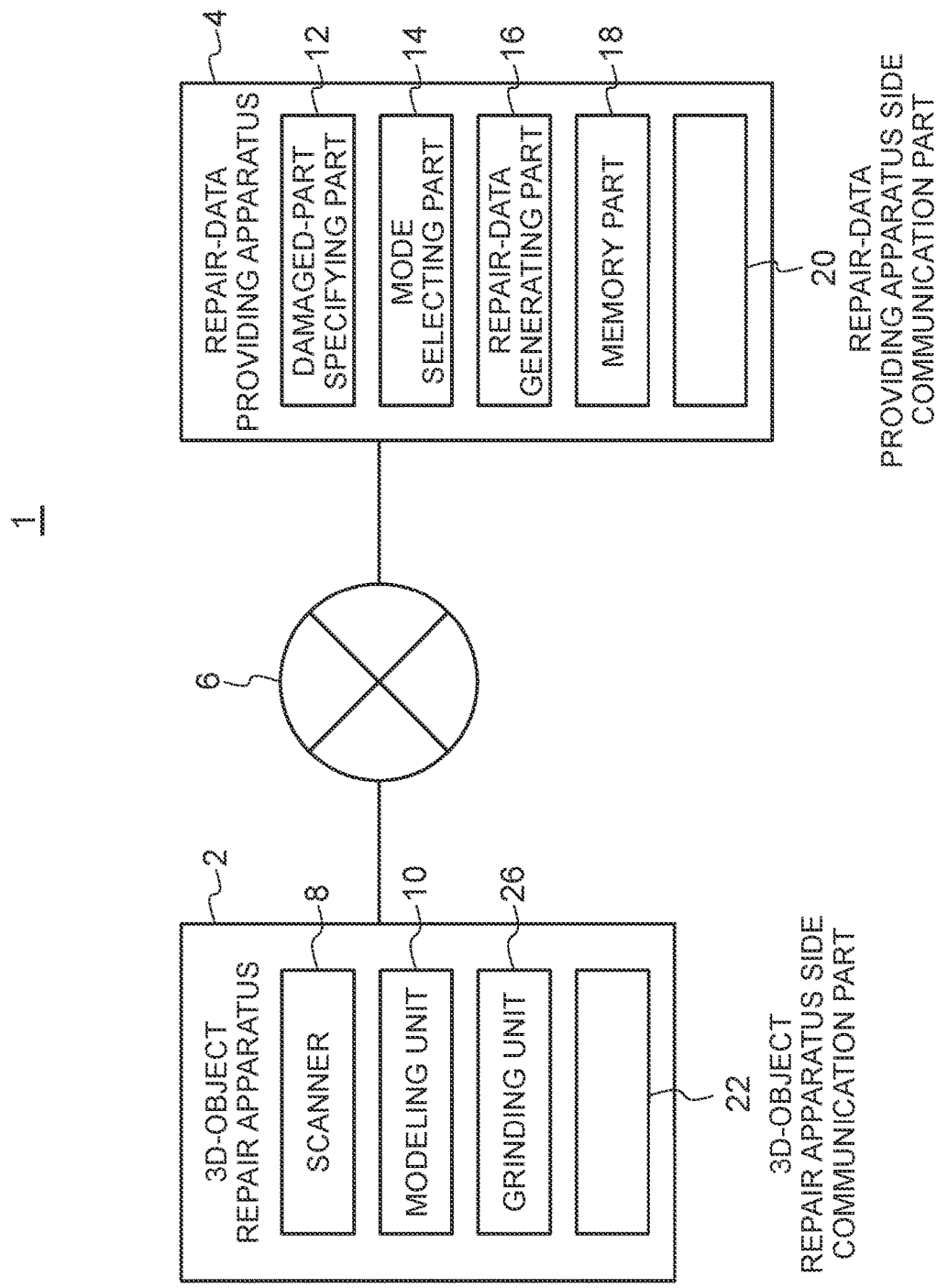
FIG. 5 is a schematic overall diagram of a repair system according to some embodiments.

Furthermore, as depicted in FIG. 5, instead of the melting unit 24, a grinding unit 26 for grinding the periphery of the damaged part of the object to be repaired may be provided. The repair system 1 depicted in FIG. 5 is similar in configuration to the repair system 1 depicted in FIG. 1, except for the grinding unit 26. In this case, during the second repair mode, the grinding unit 26 grinds the periphery of the damaged part of the object to be repaired before lamination of a modeling material. Accordingly, it is possible to repair the damaged part properly even if strain or cracks due to damage remain around the damaged part of the object to be repaired.

Furthermore, during the second repair mode, the grinding unit may adjust the depth or the range for grinding the periphery of the damaged part in accordance with the condition of the damaged surface of the object to be repaired. Accordingly, it is possible to repair the damaged part more properly even if strain or cracks due to damage remain around the damaged part of the object to be repaired. If the grinding unit 26 is to grind the periphery of the damaged part of the object to be repaired, the repair-data generating part 16 generates 3D-object repair data including the 3D-object data indicating the range to be ground on the object to be repaired.

The repair-data providing apparatus side communication part 20 may be configured to transmit the 3D-object repair data for repairing the damaged part of the object to be repaired to the 3D-object repair apparatus side communication part 22 at once, but it is desirable for the repair-data providing apparatus side communication part 20 and the 3D-object repair apparatus side communication part 22 to have the following configurations, to improve the security of the 3D-object repair data.

Figure 6:
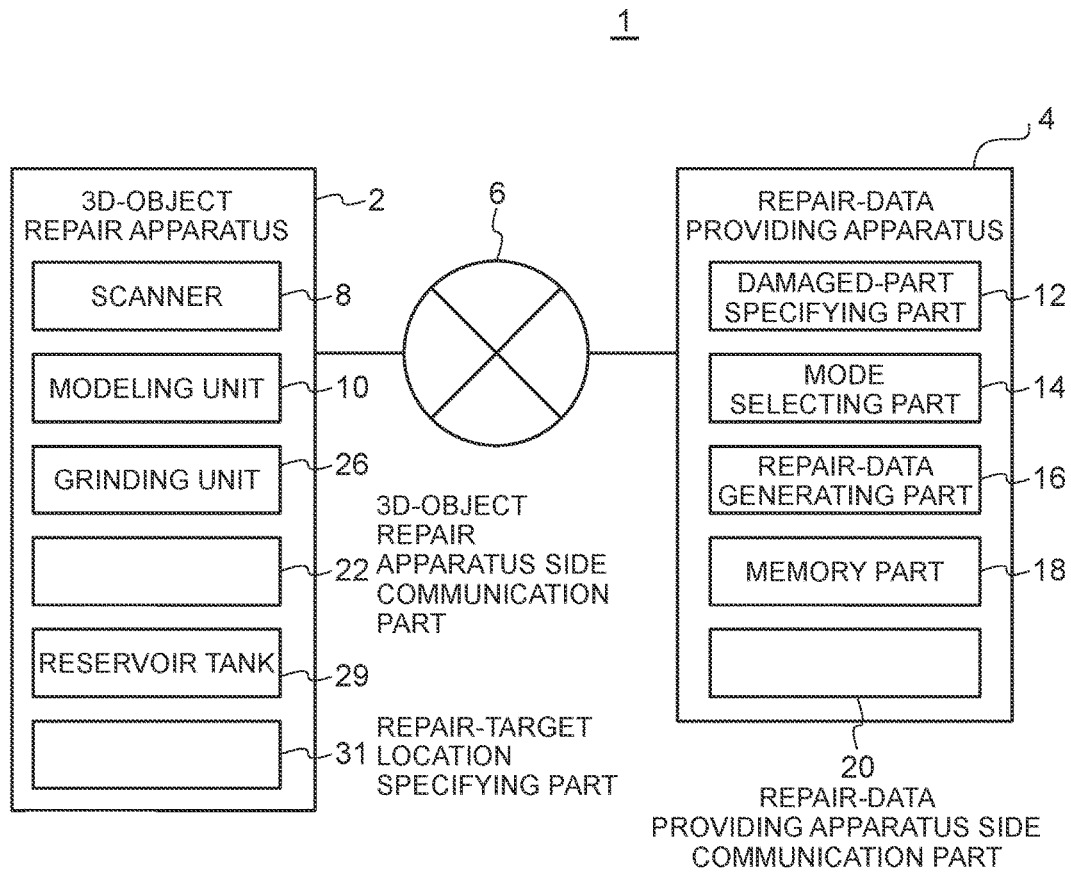
FIG. 6 is a schematic overall diagram of a repair system according to some embodiments.

Furthermore, as depicted in FIG. 6, the 3D-object repair apparatus 2 of the repair system 1 according to some embodiments may include both of the melting unit 24 and the grinding unit 26. In this case, in an embodiment, the scanner 8 may 3D-scan the object to be repaired again after the melting unit 24 melts the periphery of the damaged part, and the grinding unit 26 may perform grinding on the basis of the 3D-object data of the object to be repaired obtained by the scanner 8 after the object is melted. The grinding unit 26 performs grinding after the melting unit 24 melts the periphery of the damaged part as described above, and thereby it is possible to perform accurate grinding, and to repair the damaged part even more properly.

Furthermore, as depicted in FIG. 6, the 3D-object repair apparatus 2 of the repair system 1 according to some embodiments may include a reservoir tank 29 for storing a modeling material removed by the melting unit 24 and/or the grinding unit 26, and the modeling material stored in the reservoir tank 29 may be utilized in repair of the object to be repaired. Accordingly, it is possible to reuse a modeling material removed by melting or grinding, and thus to reduce the total amount of a modeling material used to repair the object to be repaired.

Furthermore, as depicted in FIG. 6, the 3D-object repair apparatus 2 of the repair system 1 according to some embodiments may include a repair-target location specifying part 31 configured to be capable of manually specifying a repair-target location of the object to be repaired. In this case, the damaged-part determining part 12 determines the damaged part within a range of the repair-target location specified by the repair-target location specifying part 31. Accordingly, it is possible to specify a desired repair-target location on the object to be repaired before repairing the damaged part in the specified range. While a repair-target location specifying part 31 is provided for the 3D-object repair apparatus 2 in the example depicted in FIG. 6, the repair-target location specifying part 31 may be provided for the repair-data providing apparatus 4.

Figure 7:
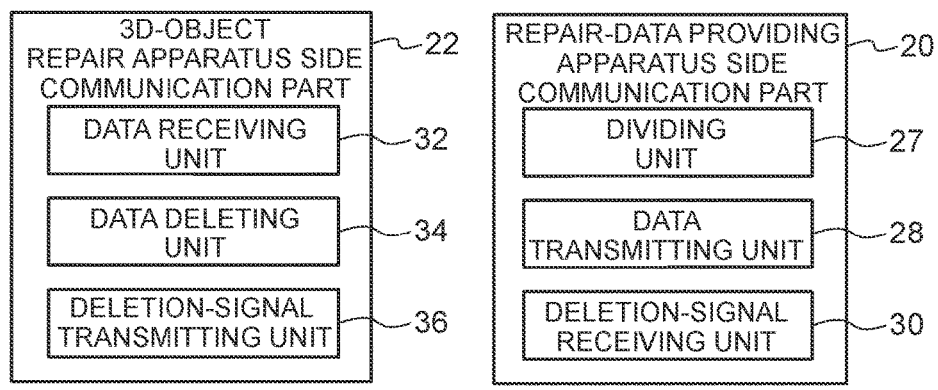
FIG. 7 is a block diagram showing configuration of communication parts of a repair-data providing apparatus and a 3D-object repair apparatus according to some embodiments.

FIG. 7 is a block diagram showing configuration of a repair-data providing apparatus side communication part 20 and a 3D-object repair apparatus side communication part 22 according to some embodiments.

The repair-data providing apparatus side communication part 20 includes a dividing unit 27 for dividing 3D-object repair data into n packets of transmission data (herein, n is a positive integer equal to or greater than two), a data transmitting unit 28 for transmitting the n packets of the transmission data to the 3D-object repair apparatus side communication part 22 in series, and a deletion-signal receiving unit 30 for receiving a deletion signal described below from the 3D-object repair apparatus side communication part 22.

The 3D-object repair apparatus side communication part 22 includes a data receiving unit 32 for receiving each packet of transmission data transmitted from the data transmitting unit 28. The modeling unit 10 (see FIG. 1) is configured to perform a modeling process (a repair process of laminating a modeling material) on the basis of each packet of the transmission data received by the data receiving unit 32.

The 3D-object repair apparatus side communication part 22 further includes a data deleting unit 34 and a deletion-signal transmitting unit 36. The data deleting unit 34 is configured to delete each packet of transmission data each time the modeling unit 10 (see FIG. 1) performs a modeling process on the basis of a packet of the transmission data. The deletion-signal transmitting unit 36 is configured to transmit, to the deletion-signal receiving unit 30, a deletion signal which indicates that a packet of the transmission data has been deleted, each time the data deleting unit 34 deletes a packet of the transmission data.

Figure 8:
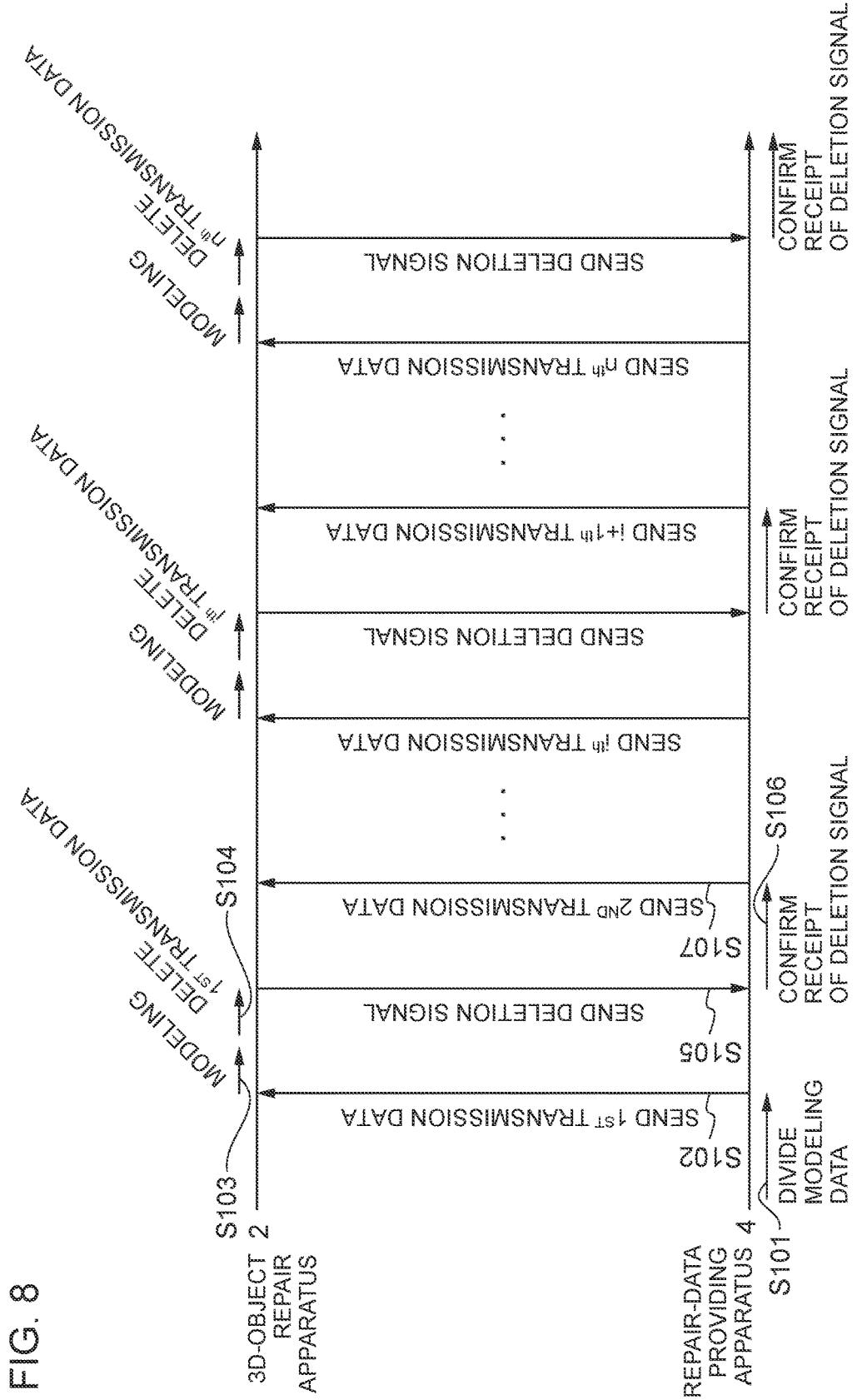
FIG. 8 is a diagram of an example of the operation sequence of a 3D-object repair apparatus and a repair-data providing apparatus after generation of 3D-object repair data.

FIG. 8 is a diagram of an example of the operation sequence of the 3D-object repair apparatus 2 and the repair-data providing apparatus 4 after generation of 3D-object repair data by the repair-data providing apparatus 4 depicted in FIG. 1.

The 3D-object repair apparatus 2 and the repair-data providing apparatus 4 depicted in FIG. 8 operate as follows. In S101, the dividing unit 27 divides 3D-object repair data generated by the repair-data generating part 16 into n packets of transmission data. In S102, the data transmitting unit 28 transmits the first packet of the n packets of transmission data to the data receiving unit 32 of the 3D-object repair apparatus 2. In S103, the modeling unit 10 performs a modeling process (lamination of a modeling material) on the basis of the first transmission data. In S103, the above described melting process by the melting unit 24 and/or grinding process by the grinding unit 26 may be performed before the modeling process by the modeling unit 10. In S104, the data deleting unit 34 deletes the first transmission data. In S105, the deletion-signal transmitting unit 36 transmits a deletion signal indicating deletion of the first packet of transmission data to the deletion-signal receiving unit 30. In S106, the data transmitting unit 28 confirms receipt of the deletion signal indicating deletion of the first packet of transmission data by the deletion-signal receiving unit 30. In S107, on the condition that receipt of the deletion signal is confirmed in S106, the data transmitting unit 28 transmits the second packet of transmission data to the data receiving unit 32. The same operation is repeated until the deletion-signal receiving unit 30 confirms a deletion signal indicating that the $n^{th}$ packet of transmission data has been deleted, and the repair system 1 completes a repair operation. Whether to perform the above described melting process by the melting unit 24 and/or grinding process by the grinding unit 26 before the modeling process by the modeling unit 10 may be determined individually for each of the divided transmission data.

As described above, the data transmitting unit 28 confirms receipt by the deletion-signal receiving unit 30 of a deletion signal indicating deletion of the $i^{th}$ packet (herein, i is a positive integer less than n) of the n packets of transmission data (the $i^{th}$ packet of the transmission data), and then transmits the $i+1^{th}$ packet of the n packets of transmission data (the $i+1^{th}$ packet of the transmission data) to the data receiving unit 32 of the 3D-object repair apparatus 2. Accordingly, it is possible to avoid a situation in which the 3D-object repair apparatus 2 has all of the 3D-object repair data at once. Therefore, it is possible to reduce the risk of duplication of the whole 3D-object repair data against the will of the sender of the 3D-object repair data.

Next, the process of dividing the 3D-object repair data by the dividing unit 27 depicted in FIG. 7 will now be described with reference to FIG. 9.

Figure 9:
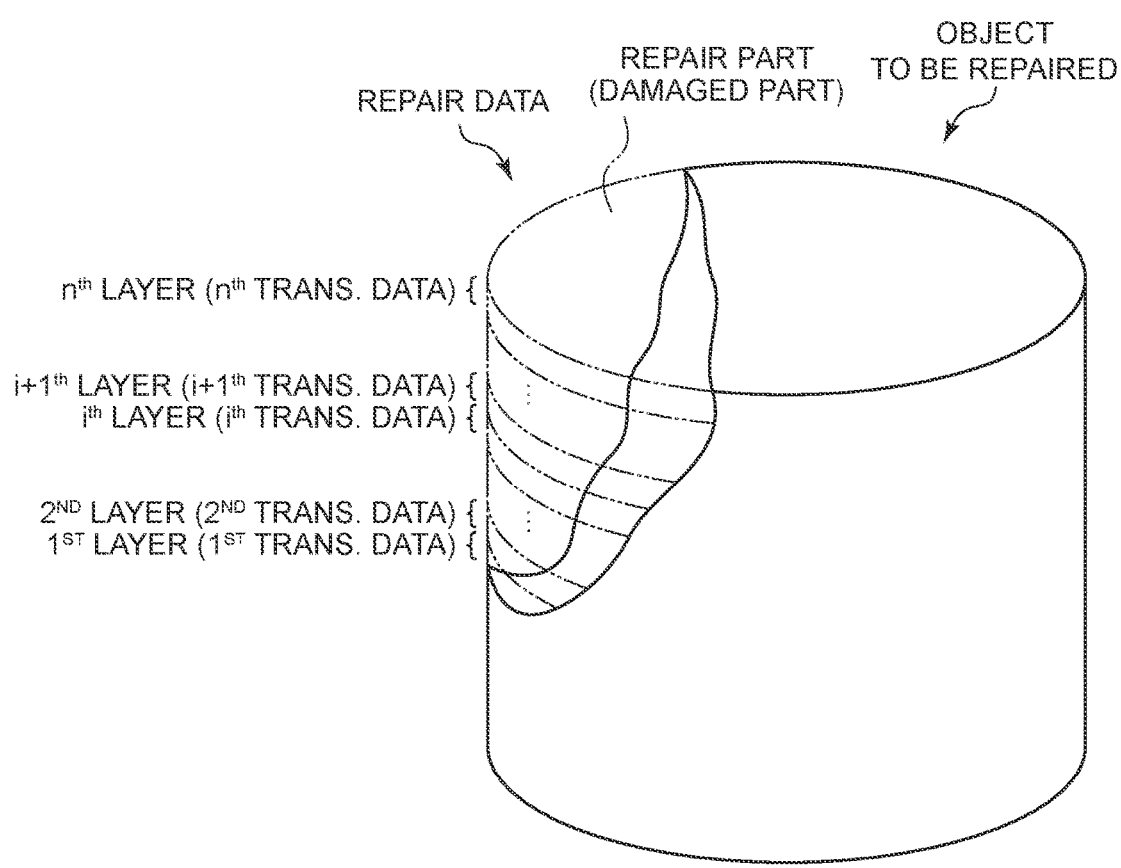
FIG. 9 is a schematic diagram for describing a method of dividing 3D-object repair data according to some embodiments.

FIG. 9 is a diagram for describing a method of dividing 3D-object repair data according to some embodiments. As depicted in FIG. 7, the dividing unit 27 according to some embodiments is configured to divide the 3D-object repair data into units each of which corresponds to a single layer of a molding material to be laminated. Specifically, the dividing unit 27 divides the 3D-object repair data into n packets of transmission data so that each packet corresponds to one of the layers that make up a repair part (so that the $i^{th}$ packet of the transmission data corresponds to the $i^{th}$ layer of the repair part). In this case, the data transmitting unit 28 confirms receipt by the deletion-signal receiving unit 30 of a deletion signal indicating deletion of the $i^{th}$ packet of the transmission data corresponding to the $i^{th}$ layer of the repair part, and then transmits the $i+1^{th}$ packet of the transmission data corresponding to the $i+1^{th}$ layer of the repair part to the data receiving unit 32 of the 3D-object repair apparatus 2. Therefore, it is possible to reduce the risk of duplication of the whole 3D-object repair data against the will of the sender of the 3D-object repair data. The dividing unit 27 may divide the 3D-object repair data into units each corresponding to a plurality of layers of a modeling material to be laminated, in case of which it is possible to reduce the number of transmission of the transmission data as compared to a case in which the transmission data is divided into units of a single layer.

DESCRIPTION OF REFERENCE NUMERAL

1 Repair system
2 3D-object repair apparatus
4 Repair-data providing apparatus
6 Network
8 Scanner
10 Modeling unit
12 Damaged-part specifying part
14 Mode selecting part
16 Repair-data generating part
18 Memory part
20 Repair-data providing apparatus side communication part
22 3D-object repair apparatus side communication part
24 Melting unit
26 Grinding unit
27 Dividing unit
28 Data transmitting unit
29 Reservoir tank
30 Deletion-signal receiving unit
31 Repair-target location specifying part
32 Data receiving unit
34 Data deleting unit
36 Deletion-signal transmitting unit

The invention claimed is:

1. A repair system comprising:
a 3D-object repair apparatus comprising a processor, a memory, and a scanner configured to 3D-scan an object to be repaired to obtain 3D-object data of the object to be repaired, the 3D-object repair apparatus being configured to repair a damaged part of the object to be repaired by laminating a modeling material; and
a repair-data providing apparatus comprising a processor and a memory, the repair-data providing apparatus being configured to provide the 3D-object repair apparatus with 3D-object repair data for repairing the damaged part of the object to be repaired,
wherein the repair-data providing apparatus is configured to perform:
a damaged-part determining operation to determine a location of the damaged part of the object to be repaired by comparing the 3D-object data of the object to be repaired obtained by the scanner and 3D-object data of an original of the object to be repaired;
a mode selecting operation to select a repair mode from among a first repair mode of repairing only the damaged part of the object to be repaired and a second repair mode of repairing a range broader than the damaged part of the object to be repaired, the range including the damaged part, in accordance with a condition of a damaged surface of the object to be repaired; and
a repair-data generating operation to generate the 3D-object repair data corresponding to the repair mode selected by the mode selecting operation.

2. The repair system according to claim 1,
wherein the 3D-object repair apparatus further comprises a melting unit configured to melt a periphery of the damaged part of the object to be repaired, and
wherein the melting unit is configured to melt the periphery of the damaged part of the object to be repaired if the second repair mode is selected by the mode selecting operation.

3. The repair system according to claim 2,
wherein the melting unit is configured to, in the second repair mode, adjust a depth or a range for melting the periphery of the damaged part in accordance with the condition of the damaged surface of the object to be repaired.

4. The repair system according to claim 1,
wherein the 3D-object repair apparatus further includes a grinder configured to grind a periphery of the damaged part of the object to be repaired, and
wherein the grinder is configured to, in the second repair mode, grind the periphery of the damaged part of the object to be repaired before lamination of the modeling material.

5. The repair system according to claim 4,
wherein the grinder is configured to, in the second repair mode, adjust a depth or a range for grinding the periphery of the damaged part in accordance with the condition of the damaged surface of the object to be repaired.

6. The repair system according to claim 2,
wherein the 3D-object repair apparatus further includes a grinder configured to grind the periphery of the damaged part of the object to be repaired,
wherein the scanner is configured to 3D-scan again the object to be repaired after the melting unit melts the periphery of the damaged part, and
wherein the grinder is configured to perform grinding on based on post-melting 3D-object data of the object to be repaired obtained by the scanner.

7. The repair system according to claim 2,
wherein the 3D-object repair apparatus further comprises a reservoir tank for storing a modeling material removed by the melting unit, and the modeling material stored in the reservoir tank is used to repair the object to be repaired.

8. The repair system according to claim 2,
wherein the 3D-object repair apparatus or the repair-data providing apparatus is further configured to perform a repair-target location specifying operation to allow manual specification of a repair-target location of the object to be repaired, and
wherein the damaged-part determining operation determines the damaged part within a range of the repair-target location specified by the repair-target location specifying operation.

9. A repair-data providing apparatus for providing 3D-object repair data for repairing a damaged part of an object to be repaired, the repair-data providing apparatus comprising:
a processor; and
a memory,
wherein the processor is configured to perform:
a damaged-part determining operation to determine a location of the damaged part of the object to be repaired by comparing 3D-object data obtained by 3D-scanning the object to be repaired and 3D-object data of an original of the object to be repaired;
a mode selecting operation to select a repair mode from among a first repair mode of repairing only the damaged part of the object to be repaired and a second repair mode of repairing a range broader than the damaged part of the object to be repaired, the range including the damaged part, in accordance with a condition of a damaged surface of the object to be repaired; and
a repair-data generating operation to generate the 3D-object repair data corresponding to the repair mode selected by the mode selecting operation.

10. A method of generating repair data for generating 3D-object repair data for repairing a damaged part of an object to be repaired with a 3D-object repair apparatus comprising a processor and a memory, the method comprising:
a damaged-part specifying step of specifying, with the processor, the damaged part of the object to be repaired by comparing 3D-object data obtained by 3D-scanning the object to be repaired and 3D-object data of an original of the object to be repaired;
a selecting step of selecting, with the processor, a repair mode from among a first repair mode of repairing only the damaged part of the object to be repaired and a second repair mode of repairing a range broader than the damaged part of the object to be repaired, the range including the damaged part, in accordance with a condition of a damaged surface of the object to be repaired; and
a generating step of generating, with the processor, the 3D-object repair data corresponding to the repair mode selected in the selecting step.

11. The repair system according to claim 2,
wherein the 3D-object repair apparatus further includes a grinder configured to grind the periphery of the damaged part of the object to be repaired, and
wherein the grinder is configured to, in the second repair mode, grind the periphery of the damaged part of the object to be repaired before lamination of the modeling material.

12. The repair system according to claim 4,
wherein the 3D-object repair apparatus further comprises a reservoir tank for storing a modeling material removed by the grinder, and the modeling material stored in the reservoir tank is used to repair the object to be repaired.

13. The repair system according to claim 4,
wherein the 3D-object repair apparatus or the repair-data providing apparatus is further configured to perform a repair-target location specifying operation to allow manual specification of a repair-target location of the object to be repaired, and
wherein the damaged-part determining operation determines the damaged part within a range of the repair-target location specified by the repair-target location specifying operation.

14. The repair system according to claim 11,
wherein the 3D-object repair apparatus further comprises a reservoir tank for storing a modeling material removed by the melting unit and/or the grinder, and the modeling material stored in the reservoir tank is used to repair the object to be repaired.

15. The repair system according to claim 11,
wherein the 3D-object repair apparatus or the repair-data providing apparatus is further configured to perform a repair-target location specifying operation to allow manual specification of a repair-target location of the object to be repaired, and
wherein the damaged-part determining operation determines the damaged part within a range of the repair-target location specified by the repair-target location specifying operation.

* * * * *